(12) United States Patent
Stapp

(10) Patent No.: US 10,254,048 B2
(45) Date of Patent: Apr. 9, 2019

(54) HEAT EXCHANGER FOR A POWER GENERATION SYSTEM

(71) Applicant: Peregrine Turbine Technologies, LLC, Wiscasset, ME (US)

(72) Inventor: David S. Stapp, Wiscasset, ME (US)

(73) Assignee: Peregrine Turbine Technologies, LLC, Wiscasset, ME (US)

( * ) Notice: Subject to any disclaimer, the term of this patent is extended or adjusted under 35 U.S.C. 154(b) by 427 days.

(21) Appl. No.: 14/832,984

(22) Filed: Aug. 21, 2015

(65) Prior Publication Data
US 2016/0084584 A1    Mar. 24, 2016

Related U.S. Application Data

(60) Provisional application No. 62/040,988, filed on Aug. 22, 2014.

(51) Int. Cl.
| | |
|---|---|
| F28D 9/00 | (2006.01) |
| F01K 23/10 | (2006.01) |
| F01K 25/10 | (2006.01) |
| F02C 1/04 | (2006.01) |
| F01K 13/00 | (2006.01) |
| F01K 13/02 | (2006.01) |
| F02C 1/10 | (2006.01) |
| F28F 9/00 | (2006.01) |
| F28F 9/007 | (2006.01) |

(Continued)

(52) U.S. Cl.
CPC ............ *F28D 9/0006* (2013.01); *F01K 13/00* (2013.01); *F01K 13/02* (2013.01); *F01K 23/10* (2013.01); *F01K 25/103* (2013.01); *F02C 1/04* (2013.01); *F02C 1/10* (2013.01); *F28D 9/0025* (2013.01); *F28D 21/0003* (2013.01); *F28F 3/08* (2013.01); *F28F 9/001* (2013.01); *F28F 9/0075* (2013.01); *F28D 9/0031* (2013.01); *F28D 9/0037* (2013.01); *F28D 9/0062* (2013.01); *F28F 2009/004* (2013.01); *F28F 2009/0285* (2013.01); *F28F 2265/26* (2013.01)

(58) Field of Classification Search
CPC .... F28D 9/0031; F28D 9/0037; F28D 9/0062; F28D 9/0006; F28F 2265/26
USPC ........................................................ 165/166
See application file for complete search history.

(56) References Cited

U.S. PATENT DOCUMENTS

| | | |
|---|---|---|
| 3,058,018 A | 10/1962 | Deming et al. |
| 3,583,156 A | 6/1971 | Schabert et al. |

(Continued)

FOREIGN PATENT DOCUMENTS

| | | |
|---|---|---|
| DE | 10 2012-20612 | 10/2013 |
| EP | 2402697 A1 | 1/2012 |

(Continued)

OTHER PUBLICATIONS

Dostal, Supercritical Carbon Dioxide Cycle for Next Generation Nuclear Reactor, Advanced Nuclear Power Technology Program, Mar. 2004, 326 pgs.

(Continued)

*Primary Examiner* — Eric Ruppert
(74) *Attorney, Agent, or Firm* — Baker & Hostetler LLP

(57) ABSTRACT

The present disclosure relates to heat exchanger for a power generation system and related methods that use supercritical fluids, and in particular to a heat exchanger configured to minimize axial forces during operation.

20 Claims, 9 Drawing Sheets

(51) Int. Cl.
*F28D 21/00* (2006.01)
*F28F 3/08* (2006.01)
*F28F 9/02* (2006.01)

(56) References Cited

U.S. PATENT DOCUMENTS

| | | | |
|---|---|---|---|
| 3,971,211 | A | 7/1976 | Wethe et al. |
| 4,138,618 | A | 2/1979 | Jaeschke |
| 4,166,362 | A | 9/1979 | Laurent |
| 4,263,964 | A | 4/1981 | Masai et al. |
| 4,267,692 | A | 5/1981 | Earnest |
| 4,347,711 | A | 9/1982 | Noe et al. |
| 4,375,745 | A | 3/1983 | Schelp |
| 4,498,289 | A | 2/1985 | Osgerby |
| 4,520,284 | A | 5/1985 | Wolcott |
| 4,537,032 | A | 8/1985 | Kaplan |
| 4,683,392 | A | 7/1987 | MacDonald et al. |
| 4,780,637 | A | 10/1988 | Wolcott |
| 5,069,276 | A * | 12/1991 | Seidel ............ F28D 9/0037 165/166 |
| 5,323,603 | A | 6/1994 | Malohn |
| 5,582,241 | A | 12/1996 | Yoho et al. |
| 5,799,484 | A | 9/1998 | Nims |
| 5,813,215 | A | 9/1998 | Weisser |
| 6,191,561 | B1 | 2/2001 | Bartel |
| 6,318,066 | B1 | 11/2001 | Skowronski |
| 6,430,916 | B2 | 8/2002 | Sugishita et al. |
| 6,606,864 | B2 | 8/2003 | MacKay |
| 6,848,249 | B2 | 2/2005 | Coleman et al. |
| 6,945,052 | B2 | 9/2005 | Frutschi et al. |
| 6,991,026 | B2 | 1/2006 | Costen et al. |
| 7,037,430 | B2 | 5/2006 | Donaldson et al. |
| 7,669,423 | B2 | 3/2010 | Nakhamkin |
| 7,685,820 | B2 | 3/2010 | Litwin et al. |
| 7,726,114 | B2 | 6/2010 | Evulet |
| 7,880,355 | B2 | 2/2011 | Qu et al. |
| 7,966,868 | B1 | 6/2011 | Sonnichsen et al. |
| 8,196,644 | B1 * | 6/2012 | Niske ............ F28F 1/08 165/145 |
| 2001/0023580 | A1 | 9/2001 | Sugishita et al. |
| 2007/0107889 | A1 * | 5/2007 | Zaffetti ............ F28D 9/0062 165/166 |
| 2007/0125063 | A1 | 6/2007 | Evulat |
| 2010/0101231 | A1 | 4/2010 | Westmeier |
| 2010/0242429 | A1 | 9/2010 | Smith |
| 2011/0179799 | A1 | 7/2011 | Allam et al. |
| 2011/0206173 | A1 | 8/2011 | Walters |
| 2012/0216536 | A1 | 8/2012 | Ma et al. |
| 2013/0180259 | A1 | 7/2013 | Stapp |

FOREIGN PATENT DOCUMENTS

| | | |
|---|---|---|
| FR | 810379 A | 3/1937 |
| FR | 1391514 A | 3/1965 |
| JP | S63-271098 A | 11/1988 |
| JP | H11-311490 A | 11/1999 |
| JP | 2006-313054 A | 11/2006 |
| JP | 2009-522535 A | 6/2009 |
| WO | 1995/24822 A2 | 9/1995 |
| WO | 2010/151560 A1 | 12/2010 |
| WO | WO 2014/062653 A1 | 4/2014 |
| WO | 2015/130898 A1 | 9/2015 |

OTHER PUBLICATIONS

Wright, Operation and Analysis of a Supercritical CO2 Brayton Cycle, Sandia National Laboratories, SAND2010.0171, Sep. 2010, 101 pgs.
International Patent Application No. PCT/US2015/046415: International Search Report and Written Opinion dated Dec. 3, 2015, 13 pages.
International Patent Application No. PCT/US2015/046400: International Search Report and Written Opinion dated Dec. 4, 2015, 11 pages.
English translation of Chinese Application No. 201580044367.6: Notification of the First Office Action dated Aug. 28, 2017, 8 pages.

* cited by examiner

HEAT EXCHANGER FOR A POWER GENERATION SYSTEM

CROSS-REFERENCE TO RELATED APPLICATION

The present application claims priority to and the benefit of U.S. Provisional Application No. 62/040,988, filed Aug. 22, 2014, the entire contents of which are incorporated by reference into this application in their entirety.

TECHNICAL FIELD

The present disclosure relates to a heat exchanger for a power generation system and related methods that use supercritical fluids.

BACKGROUND

Traditionally, thermodynamic power generation cycles, such as the Brayton cycle, employ an ideal gas, such as atmospheric air. Such cycles are typically open in the sense that after the air flows through the components of the cycle, it is exhausted back to atmosphere at a relatively high temperature so that a considerable amount heat generated by the combustion of fuel is lost from the cycle. A common approach to capturing and utilizing waste heat in a Brayton cycle is to use a recuperator to extract heat from the turbine exhaust gas and transfer it, via a heat exchanger, to the air discharging from the compressor. Since such heat transfer raises the temperature of the air entering the combustor, less fuel is required to achieve the desired turbine inlet temperature. The result is improved thermal efficiencies for the overall thermodynamic cycle. However, even in such recuperated cycles, the thermal efficiency is limited by the fact that the turbine exhaust gas temperature can never be cooled below that of the compressor discharge air, since heat can only flow from a high temperature source to a low temperature sink. More recently, interest has arisen concerning the use of supercritical fluids, such as supercritical carbon dioxide (SCO2), in closed thermodynamic power generation cycles.

A typical thermodynamic power generation cycles that uses supercritical fluids includes compressors, turbines, combustors and heat exchangers arranged in a first Brayton cycle, in which the working fluid is a supercritical fluid, and a second Brayton cycle, in which the working fluid is ambient air. Heat exchangers required to transfer heat between the supercritical fluid cycle and the ambient cycle may be large, expensive, and impractical to implement. More effectively managing flow cycles can improve heat transfer efficiency in power generation systems that employ supercritical fluid cycles.

SUMMARY

An embodiment of the present disclosure is a heat exchanger configured for a power generation system. The heat exchanger includes at least one plate assembly having a first end, a second end opposed to the first end along an axial direction. Each plate assembly includes a plurality of plates stacked with respect to each other. The at least one plate assembly defines a first flow configuration and a second flow configuration that is separate from the first flow configuration. The first and second flow configurations extends from the first end to the second end so as to direct first and second fluids, respectively, through the at least one plate assembly. The heat exchanger includes a casing assembly that applies a tension force to the at least one plate assembly along the axial direction, such that, when the at least one plate assembly is exposed to at least predetermined temperature, each plate expands at least partially along the axial direction so as to reduce the tension force applied to the plate assembly.

BRIEF DESCRIPTION OF THE DRAWINGS

The foregoing summary, as well as the following detailed description of an embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DETAILED DESCRIPTION

Figure 1:
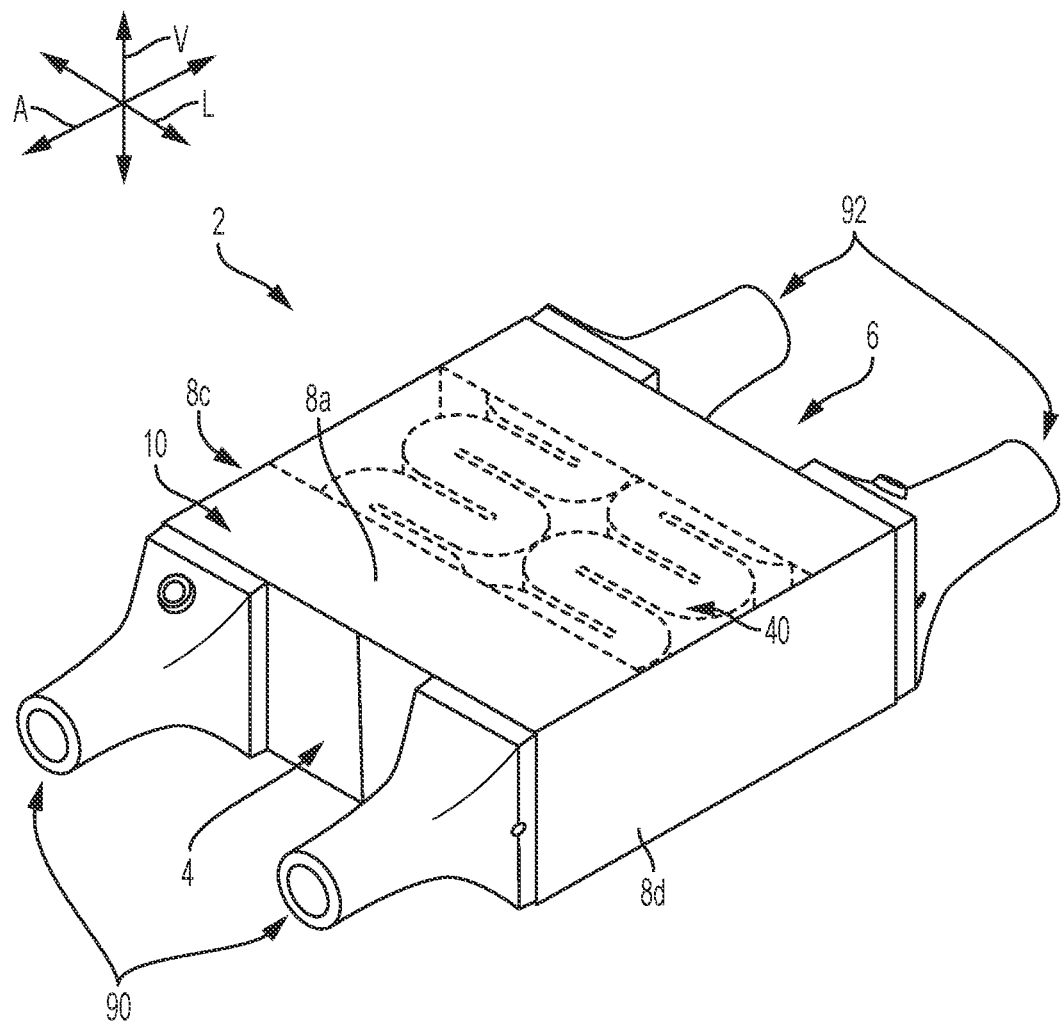
FIG. 1 is a perspective view of a heat exchanger according to an embodiment of the present disclosure.

Referring to FIG. 1, an embodiment of the disclosure is a heat exchanger 2 configured for a power generation system, such as power generation system includes a first closed Brayton cycle in that include a first fluid, which may be a supercritical fluid, and a second open Brayton cycle that includes a second fluid, which may be ambient air. An exemplary power generation system 100 is described below and illustrated in FIG. 9. The heat exchanger 2 is configured to transfer heat from one of the first and second fluids to the other of the first and second fluids, depending on the location of the heat exchanger along the power generation system.

Continuing with FIG. 1, the heat exchanger 2 includes casing assembly 10 that contains at least one plate assembly 40, such as first and second plate assembly 40a and 40b, and a plurality of manifolds, such as a first pair of manifolds 90 and a second pair of manifolds 92. The manifolds are configured to direct respective fluids through the heat exchanger 2 into define first and second flow configurations, as further explained below. The heat exchanger 2 includes a first end 4, a second end 6 opposed to the first end 2 along an axial direction A, a top 8a and a bottom 8b opposed to the top 8a along a vertical direction V that is perpendicular the axial direction A, and opposed sides 8c and 8d space apart from each other along a lateral direction L that is perpendicular the axial and vertical directions A and V. Reference to "top," "bottom," "side," "left," or "right," are for illustrative purposes and should be not limiting. The vertical and lateral directions V and L can be referred to as first and second directions.

The casing assembly 10 surrounds and supports the plate assemblies 40a and 40b. More specifically, the casing assembly 10 applies a tension force to the at least one plate assembly 40 along the axial direction A, such that, when the at least one plate assembly is exposed to at least predetermined temperature, the plate assembly 40 expands at least partially along the axial direction so as to reduce the tension force applied to the plate assembly 40. The casing assembly 10 and each plate assembly 40a and 40b can be made from materials with different thermal expansion coefficients such that the casing 10 and plate assemblies 40a and 40b expand at different temperatures, or have different expansion rates for similar temperatures. This results in a limitation on the limiting axial forces applied to the plate assembly 40 during operation and can reduce thermal fatigue stresses. This also limits thermally induced strain in various component parts which is the cause of thermal fatigue.

Figure 2A:
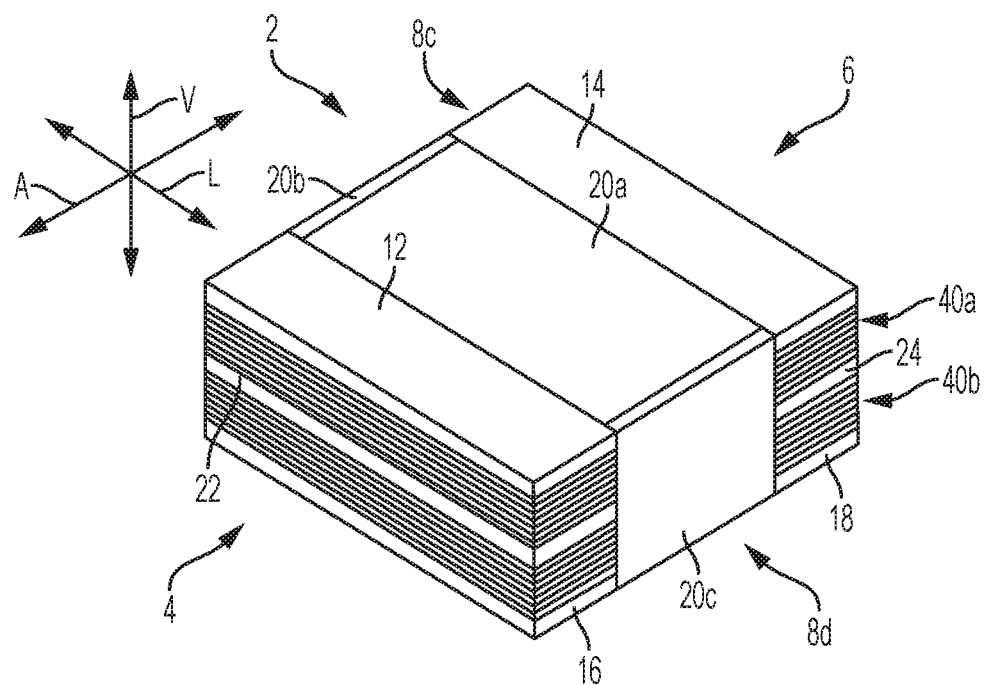
FIGS. 2A and 2B are perspective views of the heat exchanger shown in FIG. 1, with manifolds and portions of the casing assembly removed for illustrative purposes.
Figure 2B:
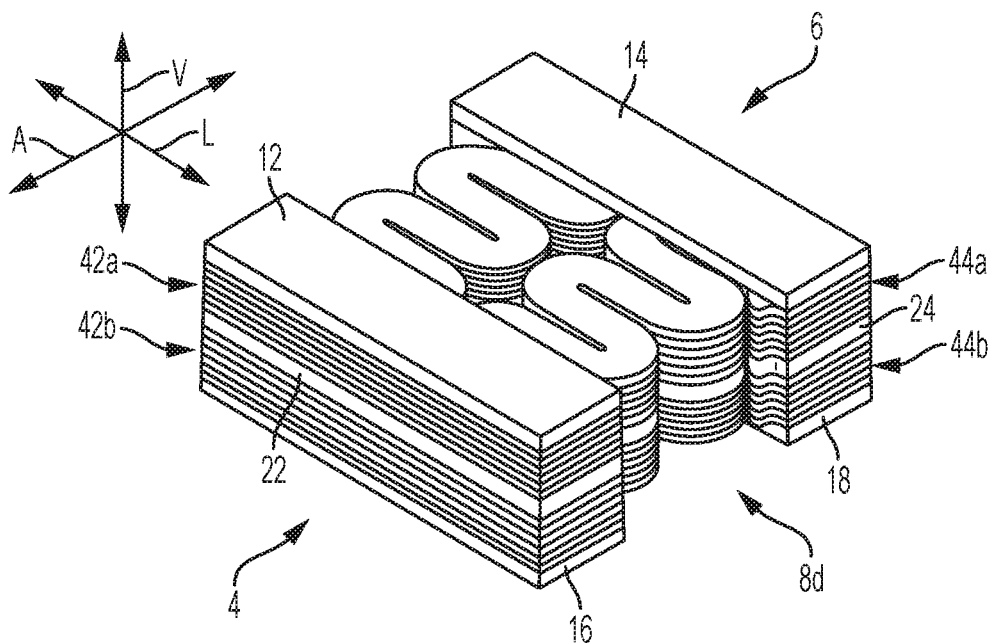
Figure 3A:
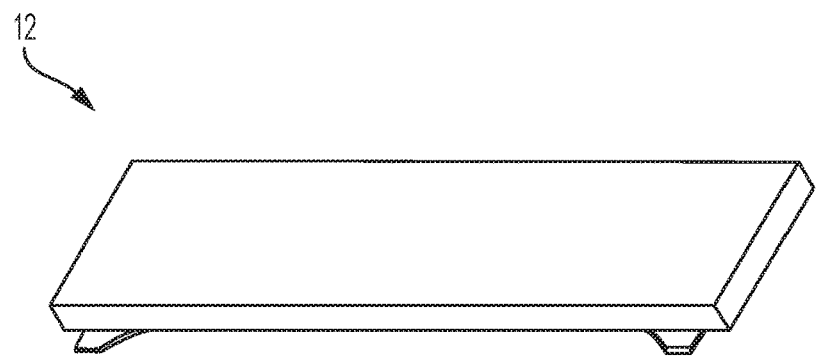
FIG. 3A is a perspective view of an outer block used in the heat exchanger shown in FIG. 1.

Continuing with FIGS. 2A and 2B, the casing assembly 10 includes a first and second top blocks 12 and 14 coupled to first and second ends 42a and 44a of the first plate assembly, respectively. First and second bottom blocks 16 and 18 are coupled to first and second ends 42b and 44b of the second plate assembly, respectively. An exemplary top block 12 is shown in FIG. 3A. Blocks 14, 16, and 18 are configured similarly to top block 12 shown in FIG. 3A. The casing assembly 10 also includes central casing panels 20a, 20b, 20c and 20d (20d not shown) disposed between the blocks 12 and 16 and blocks 14 and 18. Top and bottom central casing panels 20a and 20d are spaced apart along the vertical direction V. Central casing panels 20b and 20c are spaced apart with respect to each other along the lateral direction L. Accordingly, the central casing panels 20a, 20b, 20c and 20d surround a central portion of the plate assemblies 40a and 40b, such that central casing panels 20a, 20b, 20c and 20d are spaced apart from, and not directly attached to, portions of the plate assemblies 40a and 40b. The casing panels 20a, 20b, 20c and 20d can be evacuated to eliminate heat transfer from the plate assemblies 40a and 40b to the casing assembly 10. Furthermore, one or more pressure sensors (not shown) can be used to monitor leakages. The casing assembly 10 can further define a sealed environment, specifically the casing assembly is vacuum sealed.

Figure 3B:
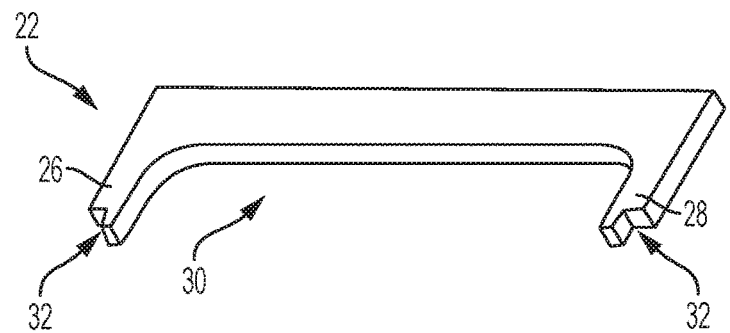
FIG. 3B is a perspective view of an intermediate block used in the heat exchanger shown in FIG. 1.
Figure 4:
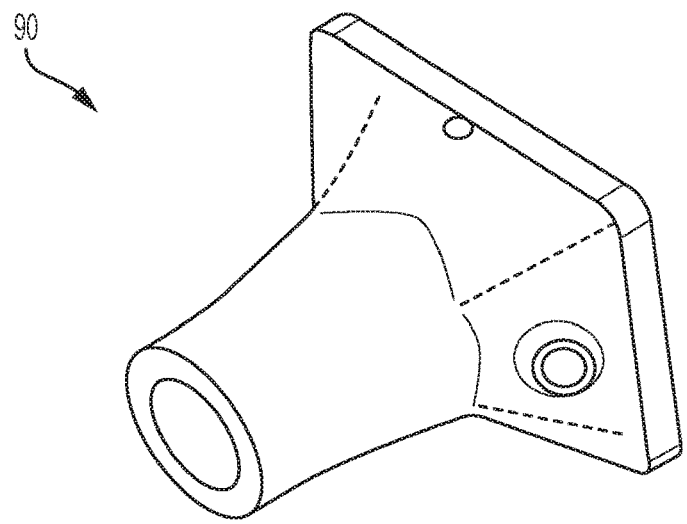
FIG. 4 is a perspective view of manifold used in the heat exchanger shown in FIG. 1.

Referring to FIGS. 2A and 2B, the heat exchanger 2 also includes first and second intermediate blocks 22 and 24. The first intermediate block 22 is positioned between first ends 42a and 42b of plate assemblies 40a and 40b. The second intermediate block 24 is positioned between second ends 44a and 44b of plate assemblies 40a and 40b. Accordingly, the intermediate blocks 22 and 24 space apart the first and second plate assemblies 40a and 40b with respect to each other along the vertical direction V. As shown in FIG. 3B, the intermediate blocks 22 and 24 each include arms 26 and 28, respectively, that define a u-shape gap 30 therebetween. The outer sides the arms 26 and 28 include cutouts 32 that receive ends of the central side casing panels 20b and 20c such that casing panels 20b and 20c are flush with outer end of the intermediate blocks. Securement of the intermediate blocks 22 and 24 to the ends of the plate assemblies 40a and 40b decouples the mechanical responses, such as expansion and contraction, of each plate assembly 40a and 40b to fluctuations in temperature exposures during operation. In other words, the first and second plate assemblies 40a and 40b can independently expand along the axial direction A when exposed to at least the predetermined temperature.

Figure 5A:
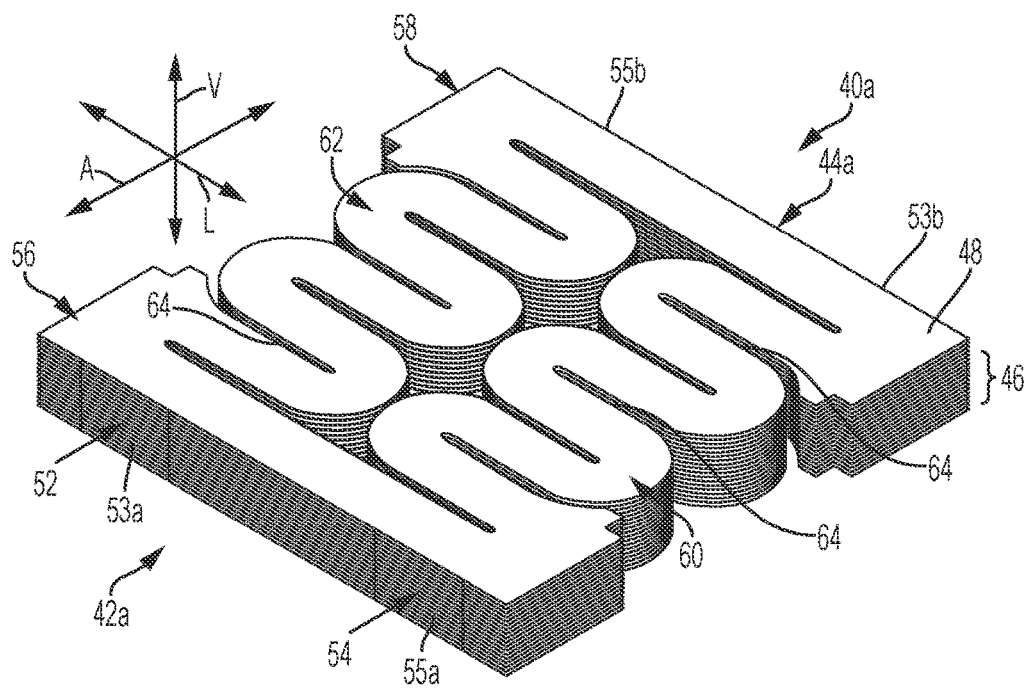
FIG. 5A is a perspective view of a plate assembly used in the heat exchanger shown in FIG. 1.
Figure 5B:
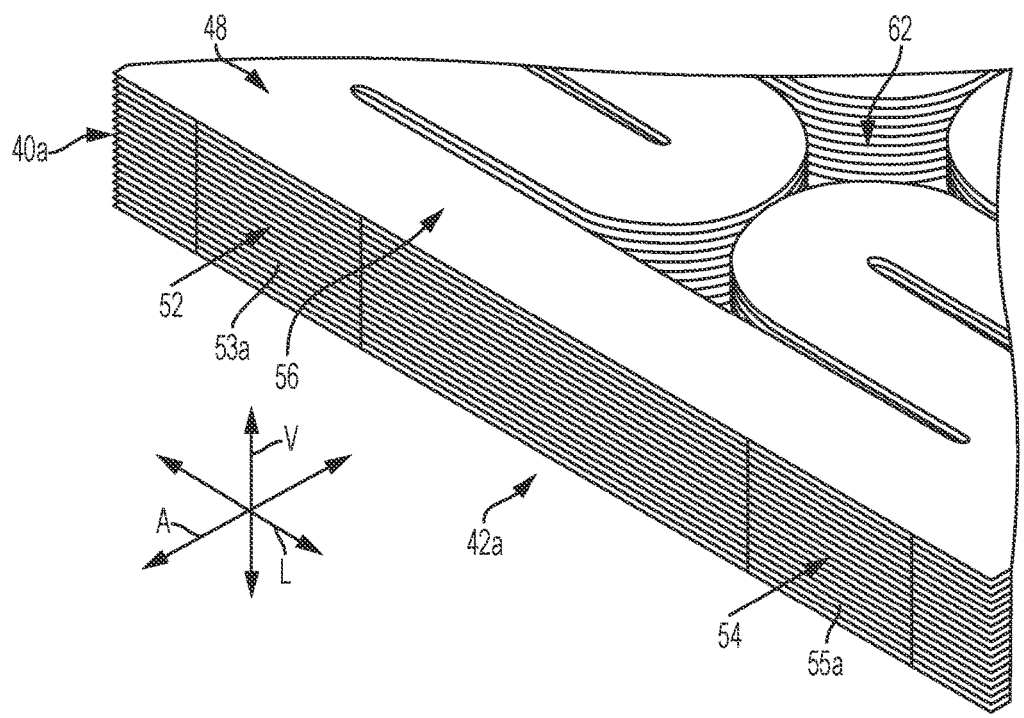
FIG. 5B is a detailed perspective view of a portion of the plate assembly shown in FIG. 5A.

FIGS. 5A and 5B illustrate a first plate assembly 40a used in the heat exchanger 2. The second heat exchanger 40b is substantially similar to the first plate assembly 40a. Thus, only the first plate assembly 40a will be described below. The plate assembly 40a includes a plate stack including a plurality of plates 70 stacked with respect to each other, an upper capping plate 48 and a lower capping plate 50 (not shown). The plates 46, 48 and 50 can have substantially the same shape. In the illustrated, embodiment, the plate assembly 40a includes ten separate plates. However, more than ten or less than ten plates could be used.

Continuing with FIGS. 5A and 5B, the plate assembly 40a defines first flow configuration 52 and a second flow configuration 54 that is separate from the first flow configuration 52. The first and second flow configurations 52 and 54 each extend from the first end 42a to the second end 44a so as to direct first and second fluids, respectively, through the plate assembly 40a. As illustrated, the first end 42a can define an inlet end of the plate assembly 40a and the second end 44a can define an outlet end of the plate assembly 40a, such that fluids generally travel across the heat exchanger 2 from the end 42a to end 44a. Accordingly, the first flow configuration 52 includes a first inlet 53a defined by the first end 42a of the plate assembly 40a and a first outlet end 53b defined by the second end 44a. The second flow configuration 54 includes a second inlet 55a defined by the first end 42a and a second outlet 55b by the second end 44a of the plate assembly 40a.

The heat exchanger 2 is assembled in a cool state such that plate assembly 40a is placed in tension along the axial direction A. When heating during use, at least a portion of plate assembly 40a can expand along the axial direction A so as to minimize axial forces when the plate assembly 40a is exposed to the design operating temperatures. For instance, the plate assembly 40a includes a first platform segment 56 that defines the first end 42a, a second platform segment 58 that defines the second end 44a, and a serpentine portion which extends between the first platform segment 56 and the second platform segment 58. The serpentine portion includes as first and second serpentine segments 60 and 62. The serpentine segments 60 and 62 include slot portions 64 configured to permit expansion and contraction the serpentine segments 60 and 62 along the axial direction A.

The first pair of manifolds 90 attached to the first end 42a of the plate assembly 40a so as to be aligned with the pair in inlets 53a and 55a first pair of openings of the first and second flow configurations. The second pair of manifolds 92 attached to the second end 44a of the plate assembly 40a so as to be aligned with the outlets 53b and 55b.

Figure 5C:
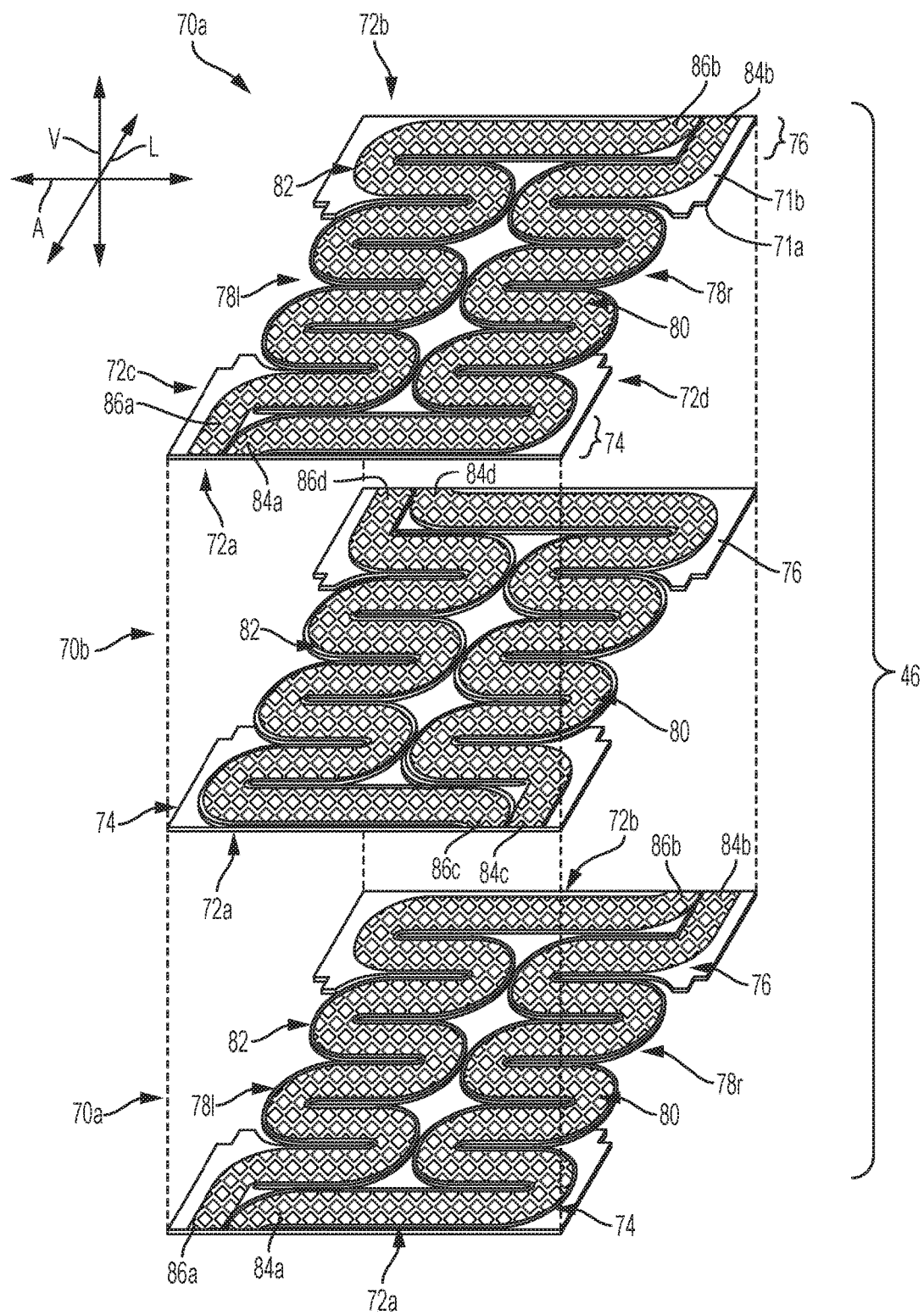
FIG. 5C is an exploded perspective view of first, second and third plates of the plate assembly shown in FIG. 5A.

FIG. 5C illustrates the configuration of plates that define the plate assembly 40a. As noted above, the plate stack 46 includes a plurality of plates arranged that define first and second flow configurations 52 and 54 described above. FIG. 5C illustrates three plates in an exploded view. The upper and lower plates are similar and each can be referred to as a first plate type 70a. The central plate 70b differs from the plate 70a and can be referred to as the second plate type.

Accordingly, the stack 46 includes first and second plate types that define the flow configurations 52 and 54 as further detailed below. Plate 70a will be described below, it being understood the plates 70a and 70b are similar unless noted otherwise. Plate 70a includes opposed ends 72a and 72b, a left side 72c and a right side 72d opposed to left side 72c along the lateral direction. As illustrated, the left side 72c is disposed on the left side of the page and the right side 72d is to the right of the left 72c on the sheet. Use of "left" and "right" should be not limiting here. Plate 70a also defines a lower surface 71a and an upper surface 71b opposed to the lower surface. The lower surface 71a is substantially planar. The upper surface 71b defines first and second flow channels 80 and 82. The first and second flow channels 80 and 82 will described further below.

Continuing with FIG. 5C, the plate 70a includes a first platform 74, a second platform 76, and at least one serpentine segment that extends from the first platform 74 to the second platform 76. As illustrated, the plate 70a includes a first serpentine platform 78r and a second serpentine platform 78l. When the plates are assembled into the stack 46, the first platforms for each plate define the first platform segment 56 of the plate assembly 40a, the second platforms for each plate define the second platform segment 58 of the plate assembly 40a, the first serpentine platforms of the plates define the first serpentine segment 60 of the plate assembly 40a, and the second serpentine platforms define the second serpentine segment 62 of the plate assembly 40a. Each plate further defines a plurality of slots 64 that are elongate along a lateral direction L. Each slot 64 permits each plate 70a to at least partially expand along the axial direction A.

As described above, each plate defines a first flow channel 80 and a second flow channel 82 that is separate from the first flow channel 80. The first flow channel 80 extends along the first serpentine platform 78r and the second flow channel 82 extends along the second serpentine platform 78l. The plate 70a includes first flow channel portals 84a and 84b disposed at opposed ends 72a and 72b of the plate 70a, respectively. The plate 70a also includes a second flow channel portals 86a and 86b disposed at opposed ends 72a and 72b of the plate 70a, respectively. Plate 70b, however, includes first flow channel portals 84c and 84d disposed at opposed ends 72a and 72b of the plate 70b, respectively. The plate 70b also includes second flow channel portals 86c and 86d disposed at opposed ends 72a and 72b of the plate 70b, respectively The differences between plate 70a, or the first plate type, and plate 70b, or the second plate type, is the location of the flow channel portals along opposed ends 72a and 72b of the plates. More specifically, plate 70a includes first and second flow channel portals configured as inlets 84a and 86a that are disposed closer to the left side 72c than the right side 72d, and first and second flow channel portals configured as outlets 84b and 86b that are disposed closer to the right side 72d than the left side 72c. Plate 70a may be referred to as a "right exit" plate. Plate 70b, however, includes first and second flow channel portals configured as inlets 84c and 86c that are disposed closer to the right side 72d than the left side 72c, and first and second flow channel portals configured as outlets 84d and 86d that are disposed closer to the left side 72c than the right side 72d. Plate 70b may be referred to as a "left exit" plate. The first and second plates 70a and 70b are alternatingly stacked such that first and second flows channels of each first plate 70a define the first flow configuration 52, and the first and second channels of each second plate 70b define the second flow configuration 54. At least a portion of the first flow channel 80 and the second flow channel 82 are parallel to each other along platform portions.

Figure 6:
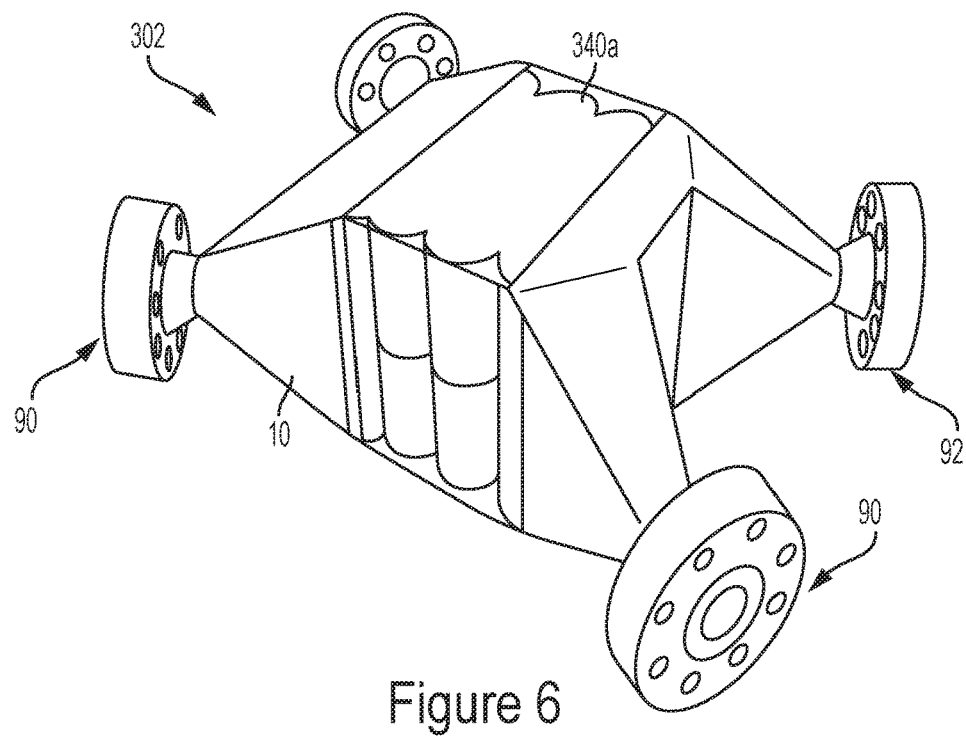
FIG. 6 is a perspective view of a heat exchanger according to another embodiment of the present disclosure.
Figure 7:
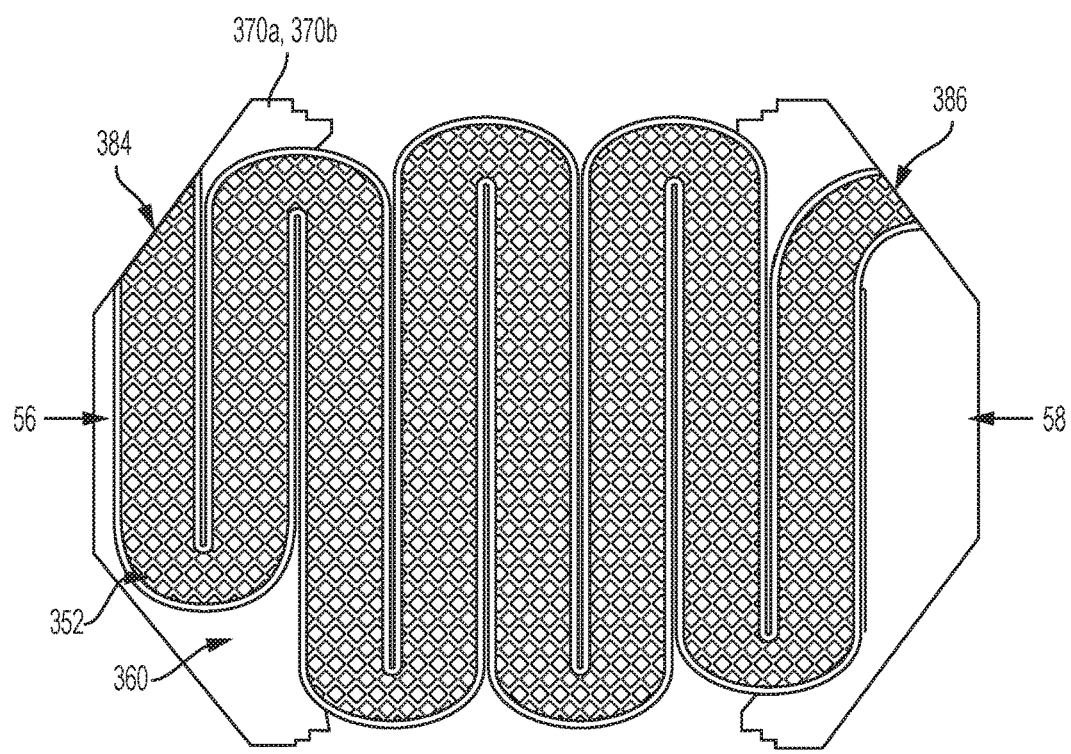
FIG. 7 is a plan view a plate used in the heat exchanger shown in FIG. 6.

FIGS. 6 and 7 illustrates a heat exchanger 302 according to another embodiment of the present disclosure. The heat exchanger 302 is similar to heat exchanger 2. Similar components of each heat exchanger has similar reference signs. In accordance with the illustrated embodiment, the heat exchanger 302 includes casing assembly 10 and a plate assembly 340a. Furthermore, each plate assembly 340a includes a plurality of stacked plates, including a first type of plate 370a and a second type of plate 370b. Each plate defines a single serpentine segment 360 that extends between platform end 56 and 58. Furthermore, plate 370a defines a single flow channel 352 that extends along the serpentine platform 360. The plate assembly 340a defines portals 384 and 386. The casing assembly 10 applies a tension force to the plate assembly 340a along the axial direction A, such that, when the plate assembly 340a is exposed to at least a predetermined temperature, the plate assembly 340a expands at least partially along the axial direction A so as to reduce the tension force applied to the plate assembly 340a.

FIGS. 8A-8D illustrate heat exchanger 402 according to another embodiment of the present disclosure. The heat exchanger 402 is similar to heat exchanger 2. Similar components of each heat exchanger has similar reference signs. The heat exchanger 402 includes a casing assembly 410 and at least one plate assembly 440a including a first end, a second end opposed to the first end along the axial direction A.

Each plate assembly 440a includes a plurality of plates 470 stacked with respect to each other along the lateral direction L. The heat exchanger defines a first flow configuration 442 through the plate assembly 440a and the second flow configuration 444 that is defined by gaps between adjacent plates 470 in each plate assembly 440a. A plurality of plate assemblies 440a can be arranged end-to-end along the axial direction A.

Figure 8A:
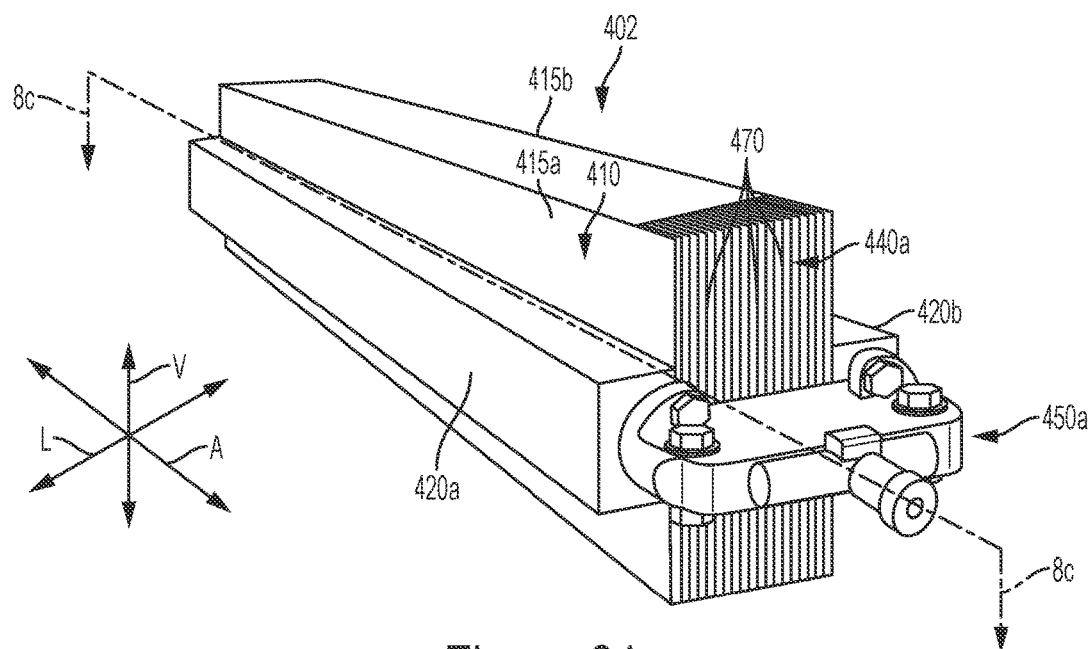
FIG. 8A is a perspective view of a heat exchanger according to another embodiment of the present disclosure.
Figure 8B:
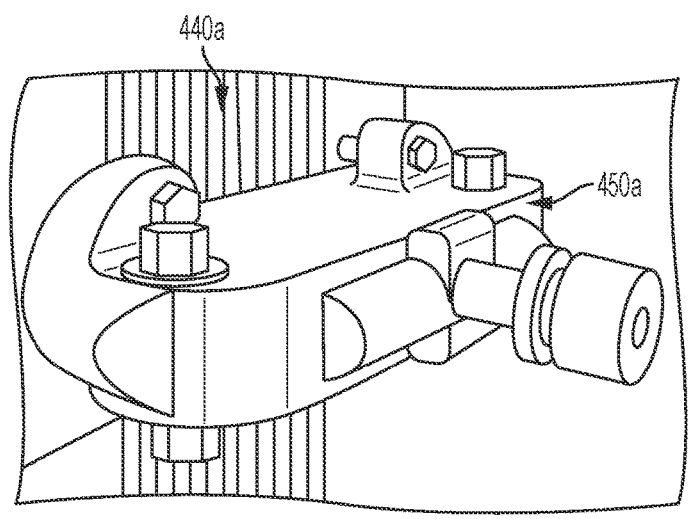
FIG. 8B is detailed view of a connector illustrated in FIG. 8A.
Figure 8C:
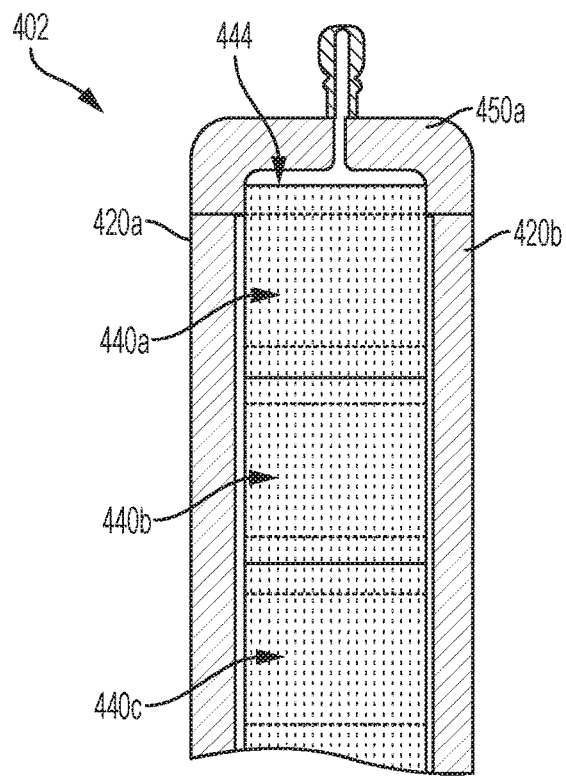
FIG. 8C is a section view of the heat exchanger illustrated in FIG. 8A.
Figure 8C:
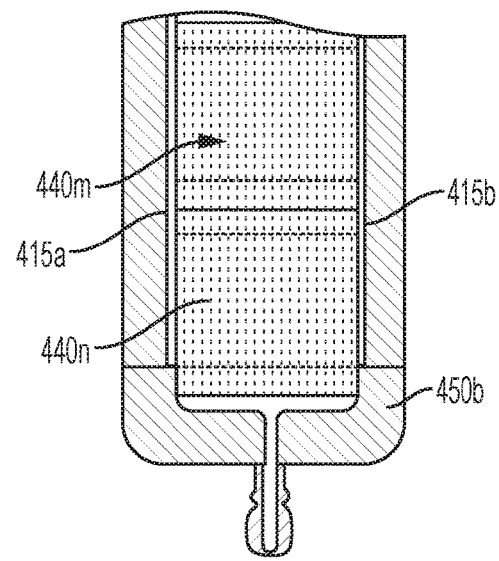
Figure 8D:
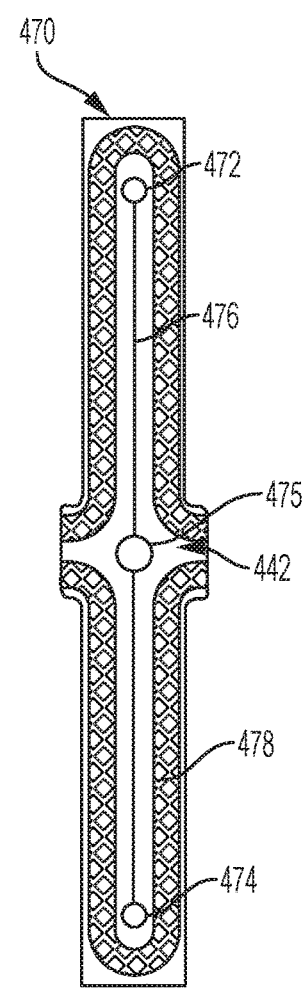
FIG. 8D is a plan view a plate used in the heat exchanger shown in FIG. 8A.

The casing assembly 410 include casing panels 415a and 415b, and a pair of compression rails 420a and 420b. Each compression rail 420a and 420b includes a first end and second opposed to the first end along the axial direction A. The compression rails 420a and 420b apply a force to the plate assembly 440a along the lateral direction L. The compression rails may be made of a ceramic materials, such as silicone carbide. The heat exchanger 402 also includes a first coupler assembly 450a that couples first ends of the pair of compression rails 420a and 420b to each other, and a second coupler assembly 450b that couples second ends of the pair of compression rails 420a and 420b to each other. The first coupler assembly 450a is coupled to an inlet end of a first plate assembly 440a, such that the first coupler assembly 450a defines an inlet path for a fluid into the first plate assembly 440a. The second coupler assembly 450b is coupled to outlet end of a second plate assembly 440n, such that the second coupler assembly 450b defines an outlet path for the fluid to exit the second plate assembly 450n. As shown in FIG. 8D, each plate 470 includes a first curve cutout 472, a second curved cutout 474, a central cutout 475, and a slot 476 that extends from first curved cutout 472 to the second curved cutout 476. Each plate 470 defines an internal flow channel 478. The flow channels 478 of each plate in heat exchanger 402 defines the first flow configuration.

Figure 9:
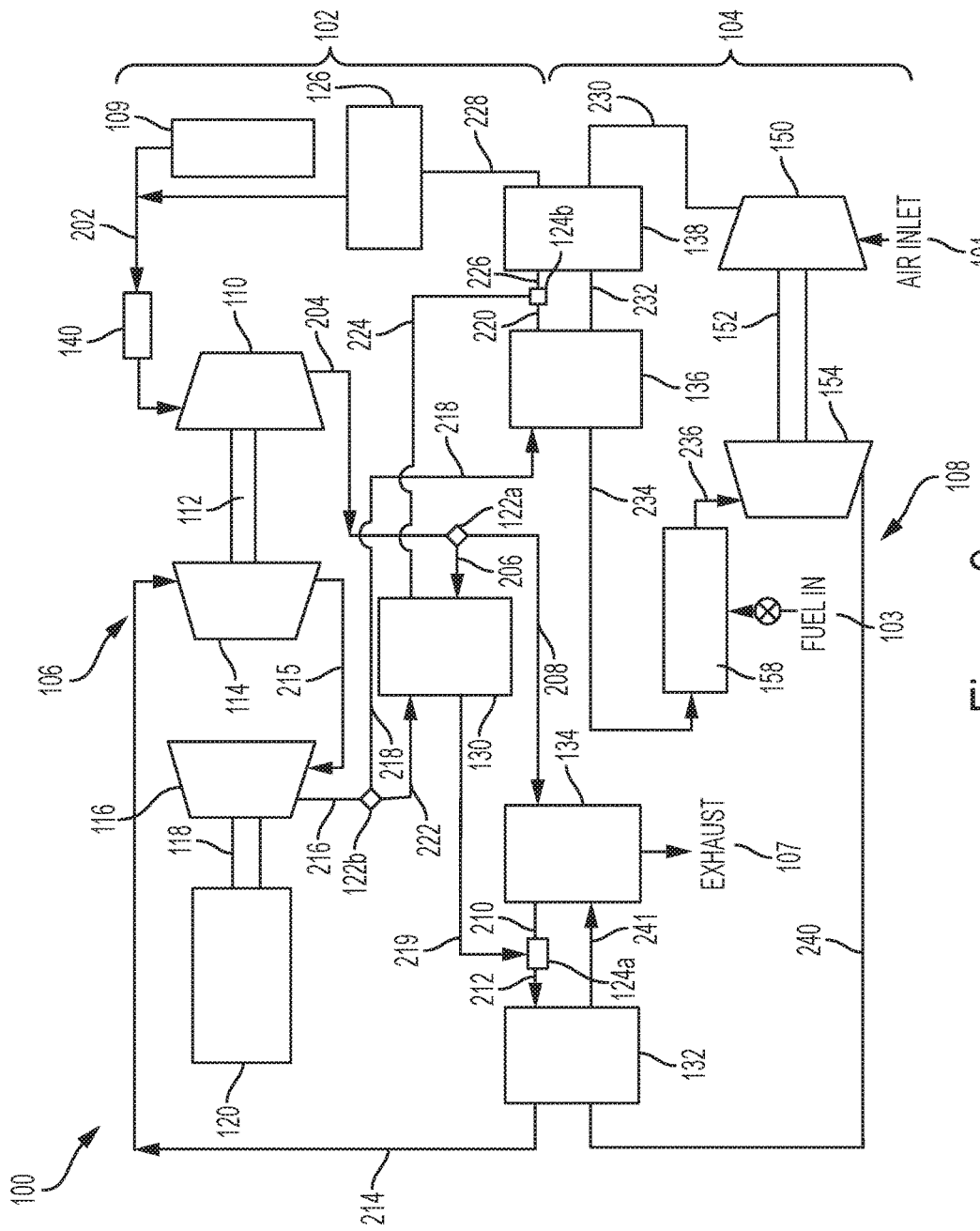
FIG. 9 is a schematic diagram of a power generation system according to an embodiment of the disclosure.

FIG. 9 is a schematic diagram of a power generation system 100 according to an embodiment of the disclosure.

The power generation system 100 includes a first closed Brayton cycle 102, in which the working fluid may be a supercritical fluid, and a second open Brayton cycle 104, in which the working fluid may be ambient air. The first Brayton cycle 102 and the second Brayton cycle 104 include a supercritical fluid flow path 106 and an air fluid flow path 108, respectively. The flow paths 106 and 108 are, in one embodiment, separate so that little or no mixing occurs between the supercritical fluid and air between the two flow paths 106 and 108.

The power generation system 100 includes compressors, turbines, one or more combustors, and a plurality of heat exchangers connected along the flow paths 106 and 108. The heat exchangers include a plurality of cross-cycle heat exchangers 132, 134, 136, and 138. As used herein, the term "cross cycle heat exchanger" refers to a heat exchanger that receives air or both air and combustion gas from the air breathing cycle 104 as well as a supercritical fluid from the supercritical fluid cycle 102 and transfers heat between the fluids in the two cycles. Furthermore, the power generation system 100 includes a recuperating heat exchanger 130 along the supercritical fluid flow path 106. As used herein, the term "recuperating heat exchanger" refers to heat transfers between the supercritical fluid discharged from the $SCO2$ turbine and the supercritical fluid discharged from the $SCO2$ compressor in the supercritical fluid cycle 102. The power generation system 100 also may include valves 122, flow meters 140, mixing junctions 124, and one or more controllers configured to control operation of the system 100. Any of up to all of the heat exchangers 130, 132, 134, 136, and 138, may similar to heat exchanger 2, 302, or 402 as describe above.

Continuing with FIG. 9, initially, a stream 202 of supercritical fluid is supplied to the inlet of a compressor 110, which may be an axial, radial, reciprocating or the like type compressor. The compressor 110 may be referred to as first $SCO2$ compressor 110. The compressor 110 includes a shaft 112 operably connected to a turbine 114. The turbine 114 may be referred to as first $SCO2$ turbine 114. The flow meter 140 along the stream 202 measures a flow rate of the supercritical fluid supplied to the compressor inlet. The flow meter 140 facilities control of total $SCO2$ mass in the supercritical fluid cycle 102 as well as transient flow behavior. In one embodiment, the supercritical fluid enters the inlet of the $SCO2$ compressor 110 after it has been cooled and expanded, as discussed below, to a temperature and pressure that is close to its critical point. The term "supercritical fluid" refers to a fluid in which distinct liquid and gaseous phases do not exist, and term "critical point" of a supercritical fluid refers to the lowest temperature and pressure at which the substance can be said to be in a supercritical state. The terms "critical temperature" and "critical pressure" refer to the temperature and pressure at the critical point. For carbon dioxide, the critical point is approximately 304.2° K and 7.35 MPa. In one embodiment, the supercritical fluid entering the compressor 110 is cooled to within at least ±2° K of its critical point. In a further embodiment, the supercritical fluid entering the compressor 110 is cooled to within ±1° K of its critical point. In yet another embodiment, the supercritical fluid entering the compressor 110 is cooled to within ±0.2° K of its critical point.

Continuing with FIG. 9, after compression in the $SCO2$ compressor 110, the discharge stream 204 of the supercritical fluid is split into first and second portions as first and second discharge streams 206 and 208. The streams 206 and 208 may be referred to herein as compressor discharge streams 206 and 208. The split permits the first portion of the discharge stream 204 from the compressor 110 to be recuperated and the remaining portion to be heated directly by a series of heat exchangers 134 and 132 by air fluid cycling through the flow path 108. As illustrated, the discharge stream 204 is split via valve 122a which can be in electronic communication with a controller (not shown). The controller operates or actuates the valve 122a to direct flow through the flow path 106 as needed. In one embodiment, the valve 122a is configured to direct between 55% to about 75% of the discharge stream 204 into the first discharge stream 206. The balance of the flow of the discharge stream 204 is directed to the second discharge stream 208. In another embodiment, the valve 122a is configured to direct about 67% of the discharge stream 204 into the first discharge stream 206.

Continuing with FIG. 9, the first discharge stream 206 of the supercritical fluid is directed to the recuperating heat exchanger 130 where heat is transferred from the heated $SCO2$ exiting turbine 116 to the first discharge stream 206. The stream 219 of the heated $SCO2$ discharged from the recuperating heat exchanger 130 is directed to the junction 124a and mixed with the stream 210 of heated $SCO2$ that exits the cross-cycle heat exchanger 134.

As shown in FIG. 9, the second discharge stream 208 from the $SCO2$ compressor 110 is directed to the cross cycle heat exchanger 134. In the cross cycle heat exchanger 134, the heat from the combustion gas in flow path 108 is transferred to the second discharge stream 208 of $SCO2$. The stream 210 discharged from heat exchanger 134 mixes with stream 219 of $SCO2$ from recuperating heat exchanger 130 at junction 124a, as discussed above. The junction 124a may be a joint that is connected to conduits or it may include a mixing apparatus.

The mixed stream 212 is supplied to the cross cycle heat exchanger 132. In the cross cycle heat exchanger 132, heat is transferred from the combustion gas in the flow path 108 to the mixed stream of $SCO2$. The cross cycle heat exchanger 132 discharges the stream 214 of heated $SCO2$.

The stream 214 of heated $SCO2$ from the heat exchanger 132 is directed to the inlet of the first $SCO2$ turbine 114. The first $SCO2$ turbine 114 may be an axial, radial, mixed flow, or the like type turbine. The first $SCO2$ turbine 114 expands the $SCO2$ and produces shaft power that drives the $SCO2$ compressor 110, via shaft 112. After expansion in the first $SCO2$ turbine 114, the stream 215 is cycled through a second $SCO2$ turbine 116 that produces shaft power for a generator 120, via the shaft 118. The generator 120 can provide output power for the system 100. In an alternate embodiment, the cycle 102 may include one turbine 114 with the shaft 118 connected to the turbine 114 and the generator 120. In such an embodiment, the discharge stream 216 would discharge from the turbine 114 into a valve 1202b.

Continuing with FIG. 9, the discharge stream 216 from the second $SCO2$ turbine 116 may be split into first and second portions as the discharge stream 218 and the discharge stream 202. The discharge stream 218 and the discharge stream 202 may be referred to as first and second discharge streams 18 and 202. As illustrated, the valve 1202b can spilt the discharge stream 216 into the first and second discharge streams 18 and 202. The controller operates or actuates the valve 122b. In one embodiment, the valve 122b is configured to direct between 70% to about 90% of the discharge stream 216 into the second discharge stream 202. The balance of the flow of the discharge stream 216 is directed to the first discharge stream 218. In another embodiment, the valve 122b is configured to direct about 80% of the discharge stream 216 into the second discharge stream 202. Regardless of how the SCO2 turbine discharge stream 216 is spilt, the first discharge stream 218 is directed to the cross cycle heat exchanger 136 and cooled by the flow of air passing through the heat exchanger 136 along the flow path 108.

The second discharge stream 202 is directed to the recuperating heat exchanger 130, where heat from the discharge stream 202 is transferred to first discharged stream 206 from the SCO2 compressor 110. In other words, the recuperating heat exchanger 130 cools the discharge stream 202 of SCO2. The discharge stream 224 of the cooled SCO2 from the recuperating heat exchanger 130 is mixed with an incoming stream 202 from the heat exchanger 136 at a junction 124b. From the junction 124b, the mixed stream 126 is directed to the cross-cycle heat exchanger 138 which may be optional). For instance, mixed stream 126 may be directed directly to the compressor 110. As noted above, in the cross-cycle heat exchanger 138, heat from the mixed stream 126 of SCO2 is transferred to the flow path 108 of the air cycle 104. The stream 128 of cooled SCO2 is directed through a cooler 126 (which may be optional) and is returned to the inlet of the SCO2 compressor 110 as stream 202. Additional SCO2 from a supply 109 can be introduced into the stream 202 of SCO2 directed to the SCO2 compressor 110 to make up for any leakage of SCO2 from the system. In any event, the SCO2 stream 202 is returned to the inlet of the compressor 110 and the steps of compressing-heating-expanding-cooling are repeated.

Continuing with FIG. 9, the air breathing cycle 104 portion of the overall system 100 forms an open flow path 108. Initially, ambient air 101 is supplied to an air breathing compressor 150 which may be an axial, radial reciprocating, or like type compressor. The compressor 150 includes a shaft 152 operably connected to a turbine 154. The stream 230 of compressed air from the compressor 150 is then heated in the heat exchanger 138 (which may be optional) by the transfer of heat from the mixed stream 202b of SCO2 discharged from the turbine 116 via the heat exchangers 130 and 136 as discussed above. The stream 232 of heated compressed air is then directed to the heat exchanger 136, where heat from the stream 218 of SCO2 (from SCO2 turbine 116) is transferred to the stream 232 of compressed air. The discharge stream 234 is the directed to the combustor 158. The combustor 158 raises the temperature of the compressed air stream 234 above the required temperature at the turbine inlet of turbine 154. The compressor 150 can operate via shaft 152 powered by turbine 154. The combustor 158 can receive a stream of fuel 103, such as fossil fuels or other fuel type. The combustor 158 can operate by means of a solar collector or nuclear reactor to produce system heat or some may other heat source of heat including combustion of waste, biomass, or bio-derived fuels. The discharge stream 236 of the combustion gas from the combustor 158 may be directed to the turbine 154, where it is expanded. The stream 220 of expanded hot combustion gas is directed to the heat exchanger 132, where heat is transferred from the hot combustion gas to the mixed stream 212 of SCO2 discussed above. After exiting the heat exchanger 132, the stream 241 of hot combustion gas is directed to the heat exchanger 134, where heat is transferred from the hot combustion gas to the discharge stream 208 of SCO2 from the SCO2 compressor 110, as discussed above. The discharge stream 107 of the heat exchanger 134 may be exhausted into atmosphere.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

The invention claimed is:

1. A heat exchanger configured for a power generation system, the heat exchanger comprising:
   a. at least one plate assembly including a first end, a second end opposed to the first end along an axial direction, and at least one serpentine segment that extends between the first end and the second end, the at least one serpentine segment including a plurality of slot portions aligned along a lateral direction that is perpendicular to the axial direction and configured to permit thermal expansion and contraction of the at least one serpentine segment along the axial direction, wherein each plate assembly includes a plurality of plates stacked with respect to each other, the at least one plate assembly defining a first flow configuration and a second flow configuration that is separate from the first flow configuration, the first and second flow configurations extending from the first end to the second end along the at least one serpentine segment so as to direct first and second fluids, respectively, through the at least one plate assembly; and
   b. a casing assembly that applies a tension force to the at least one plate assembly along the axial direction, such that, when the at least one plate assembly is exposed to at least predetermined temperature, each plate expands at least partially along the axial direction so as to reduce the tension force applied to the plate assembly.

2. The heat exchanger of claim 1, wherein the at least one plate assembly includes a first platform segment that defines the first end and a second platform segment that defines the second end, wherein the at least one serpentine segment extends between the first platform segment and the second platform segment.

3. The heat exchanger of claim 1, wherein the at least one serpentine segment is a first serpentine segment and a second serpentine segment that is separate from the first serpentine segment.

4. The heat exchanger of claim 1, wherein the at least one plate assembly is a first plate assembly and a second plate assembly, such that the first and second plate assembly can independently expand along the axial direction when exposed to at least the predetermined temperature.

5. The heat exchanger of claim 1, wherein the at least one plate assembly is a first plate assembly and a second plate assembly, and the first plate assembly and the second plate assembly are spaced apart with respect to each other along a vertical direction that is perpendicular to the axial direction.

6. The heat exchanger of claim 2, wherein the at least one plate assembly is a first plate assembly and a second plate assembly, and the heat exchanger further comprises a first intermediate block disposed between the first ends of the first and second plate assemblies, and a second intermediate block disposed between the second ends of the first and second plate assemblies, such that the first and second intermediate blocks separate the first plate assembly from the second plate assembly.

7. The heat exchanger of claim 1, wherein the at least one plate assembly is a first plate assembly and a second plate assembly, and the first plate assembly and the second plate assembly are spaced apart with respect to each other along the axial direction.

8. The heat exchanger of claim 1, wherein the first flow configuration includes a first inlet defined by the first end of the at least one plate assembly and a first outlet defined by the second end of the at least one plate assembly, wherein the second flow configuration includes a second inlet defined by the first end of the at least one plate assembly and a second outlet defined by the second end of the at least one plate assembly.

9. The heat exchanger of claim 8, further comprising a first pair of manifolds attached to the first end of the at least one plate assembly, and a second pair of manifolds attached to the second end of the at least one plate assembly, wherein the first pair of manifolds are aligned with a first pair of openings of the first and second flow configurations, wherein the second pair of manifolds are aligned with a second pair of openings of the first and second flow configurations.

10. The heat exchanger of claim 1, wherein the plurality of plates are stacked with respect to each other along a vertical direction that is perpendicular to the axial direction.

11. The heat exchanger of claim 1, wherein the plurality of plates are stacked with respect to each other along a lateral direction that is perpendicular to the axial direction.

12. The heat exchanger of claim 1, wherein each plate defines a first flow channel and a second flow channel that is separate from the first flow channel.

13. The heat exchanger of claim 1, wherein two different plates defines a first flow channel and a second flow channel that is separate from the first flow channel.

14. The heat exchanger of claim 12, wherein each plate includes a first platform, a second platform, and at least one serpentine segment that extends from the first platform to the second platform.

15. The heat exchanger of claim 14, wherein the at least one serpentine segment is a first serpentine platform and a second serpentine platform, and the first flow channel extends along the first serpentine platform, and the second flow channel extends along the second serpentine platform.

16. The heat exchanger of claim 12, wherein each plate includes opposed ends, a left side and a right side opposed to left side, wherein a first plate of the at least one plate assembly includes first and second flow channel inlets that are disposed closer to the left side than the right side, and first and second flow channel outlets that are disposed closer to the right side than the left side.

17. The heat exchanger of claim 16, wherein a second plate of the at least one plate assembly includes first and second flow channel inlets that are disposed closer to the right side than the left side, and first and second flow channel outlets that are disposed closer to the left side than the right side.

18. The heat exchanger of claim 17, wherein the first and second plates are alternatingly stacked such that first and second flow channels of each first plate define the first flow configuration, and the first and second flow channels of each second plate define the second flow configuration.

19. The heat exchanger of claim 12, wherein the each plate includes a lower surface and an upper surface opposed to the lower surface, wherein the lower surface is substantially planar, and the upper surface defines the first and second flow channels.

20. The heat exchanger of claim 13, wherein a portion of the first flow channel and the second flow channel are parallel to each other.

* * * * *